United States Patent Office 3,498,064
Patented Mar. 3, 1970

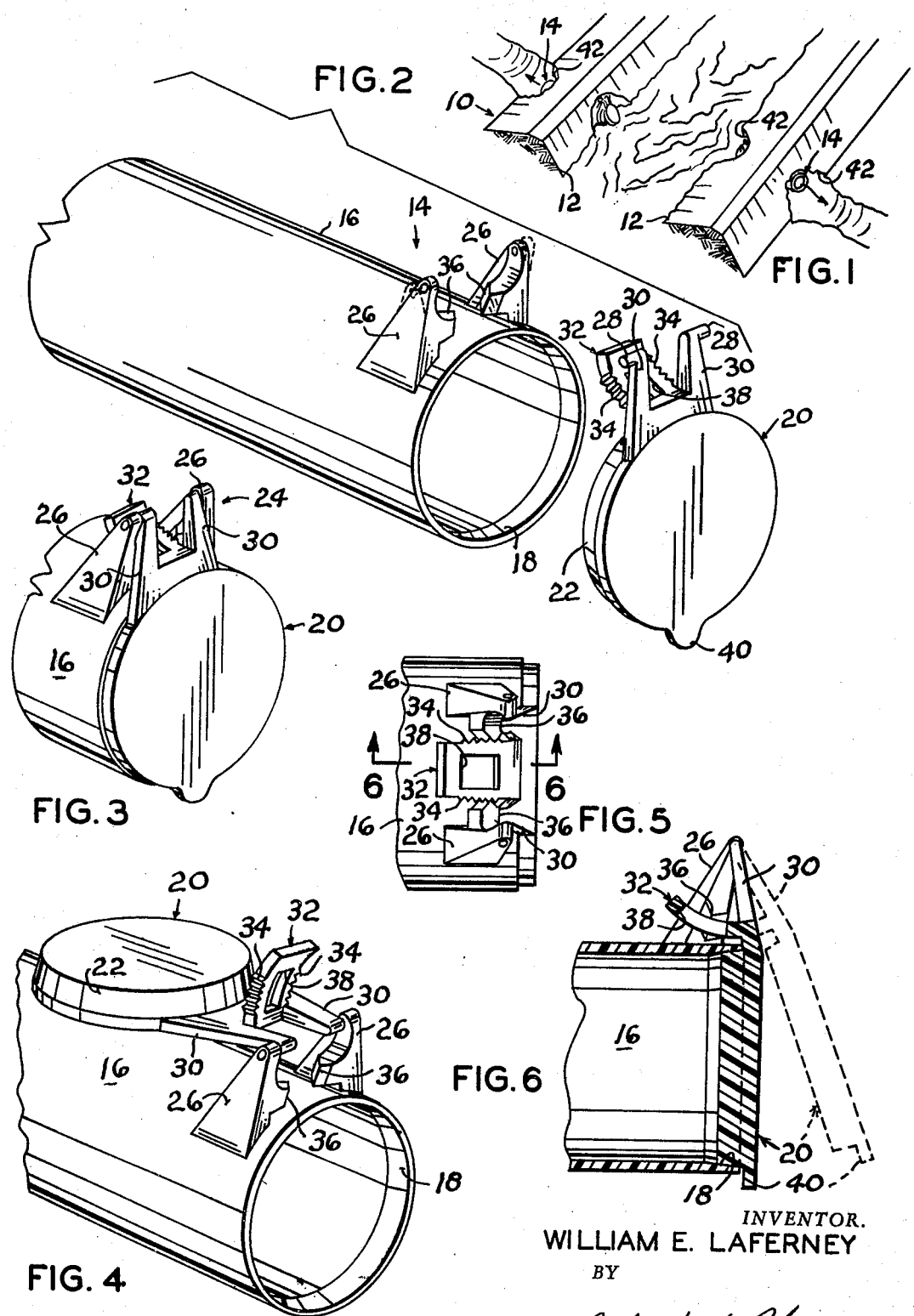

3,498,064
IRRIGATION CONDUIT END CONTROL
William E. La Ferney, Rte. 1, Box 25,
Griffithville, Ark. 72060
Filed June 11, 1968, Ser. No. 736,225
Int. Cl. E02b 7/44
U.S. Cl. 61—25  1 Claim

ABSTRACT OF THE DISCLOSURE

A disk-like stop, shaped to be partially inserted into one end of a tubular conduit, is connected to the conduit by a hinge for pivoting movement of the stop toward and away from the conduit end. Frictionally engaged members, supported by the hinge, holds the stop in selected angular positions adjacent the conduit end.

BACKGROUND OF THE INVENTION

The present invention relates to furrow irrigation and more particularly to an irrigation conduit end opening control.

In furrow irrigation it is conventional practice to provide siphon conduits which extend over the earthen walls forming the water supply canal to discharge water into the adjacent end of a cross furrow. These siphon conduits must necessarily, for operation, pass a full flow of water through the respective conduit. While this system works very well it has the disadvantage of the necessity of removing the siphon conduits to permit passage of vehicles while working the crop and to prevent damage to the siphon conduits.

The present invention eliminates the damage to water transferring conduits by recessing or burying the conduit in the water retaining wall below the level of water therein and providing a control means, preferably for the inlet end of the conduit, so that the amount of water passing therethrough may be regulated as desired.

SUMMARY OF THE INVENTION

This irrigation conduit is preferably formed of lightweight noncorrosive materials, such as plastic, and the wall defining its bore at one end is provided with a tapered seat. A disk-like stop, diametrically substantially equal with respect to the conduit, is provided with an outer tapered or converging surface which is cooperatively received by the inner tapered surface of the conduit. The stop is hingedly connected to the conduit by hinge means formed on or connected respectively with the conduit and the stop. The hinge means is separable for the removal of the stop from the conduit and includes frictionally engaged portions which adjustably maintain the stop in angular positions with respect to the conduit for controlling the quantity of water entering the conduit. The conduit is preferably buried in the dirt wall of a supply canal below the level of the water therein with its respective ends within recesses formed in the respective sides of the dirt wall so that wheels of farm implements may pass over the conduit without damage thereto.

The principal object of this invention is to provide a conduit having an adjustably positioned stop connected with one of its ends for regulating the flow of water therethrough.

BRIEF DESCRIPTION OF THE DRAWINGS

FIGURE 1 is a fragmentary perspective view of an irrigation supply canal having two of the conduits projecting through the canal walls;

FIGURE 2 is a fragmentary exploded perspective view, to a larger scale, of the stop equipped end portion of the conduit;

FIGURE 3 is a fragmentary perspective view illustrating the stop in fully closed position;

FIGURE 4 is a fragmentary perspective view illustrating the stop in an opened out-of-the-way position;

FIGURE 5 is a fragmentary top view of FIG. 3; and,

FIGURE 6 is a vertical cross-sectional view taken substantially along the line 6—6 of FIG. 5.

DESCRIPTION OF THE PREFERRED EMBODIMENT

Like characters of reference designate like parts in those figures of the drawings in which they occur.

In the drawings:

The reference numeral 10 indicates an irrigation supply canal having parallel spaced-apart dirt retaining walls 12 through which the conduit, indicated generally at 14, extends. The conduit 14 comprises an elongated tubular member 16 of a selected length having the wall forming its bore tapering outwardly, at one end, to form a seat 18. A disk-like stop 20, substantially diametrically equal with respect to the tube 16, is provided with a tapered peripheral surface 22 for cooperative seating and sealing engagement with the seat 18.

Hinge means, indicated generally at 24, connects the stop to the tube 16. The hinge means comprises a pair of spaced-apart supports 26 integrally formed with or rigidly connected to the periphery of the tube 16 adjacent its seat equipped end. The free ends of the supports 26 are alignedly drilled for removably receiving stub hinge pins 28 formed on the respective ends of a pair of spaced arms 30 formed on or secured to a peripheral portion of the stop 20 so that the stop may be vertically pivoted about the horizontal axis formed by the hinge pins 28. The hinge pins are inserted into the apertures in the supports by manually flexing the upper free end portions of the supports outwardly as shown by dotted lines (FIG. 2). The arms 30 are interconnected adjacent the stop 20 and define an arcuate, substantially rectangular in cross section, tongue member 32 which extends between the supports 26. The respective opposing side edges of the tongue 32 is provided with a transversely extending series of teeth 34 forming a serrated edge on each side of the tongue. Intermediate their ends, the opposing inward surfaces of the supports 26 are each provided with a lug-like protrusion 36 terminating in a V-shaped edge portion which is cooperatingly nested by the spacing between pairs of teeth on respective sides of the tongue for forming frictional contact between the tongue 32 and lugs 36. The tongue 32 is centrally apertured, as at 38, to permit a flexing of the respective side edge portions of the tongue when pivoting the stop.

A lift tab 40 projects outwardly of the periphery of the stop 20 opposite the hinge means 24 to facilitate opening the stop from its closed position.

OPERATION

In operation the assembled conduit 14 is buried, with the stop end toward the water in the canal, at a selected location in the water retaining walls 12. The conduit is preferably of less length than the transverse width of the dirt wall 12 and a recess 42 is formed in the side of the respective dirt wall to protect the respective ends of the conduit 14. The stop 20 is manually positioned to uncover the adjacent end of the tube 16 by lifting the stop wherein the tongue, frictionally engaged with the lugs 36, maintains the stop in a desired open position, as shown by dotted lines (FIG. 6), for the admission into the tube of a desired rate of flow of water. When a full flow of water through the tube 16 is desired the stop may be pivoted about the axis of the hinge pins 28 to overlie and be supported by the tube 16. The water control means 14 might well be termed a flip-stop action in that it may be quickly pivoted manually from a fully opened to a fully closed positon or vice versa by a flipping action of the stop about its hinge axis. Obviously the conduit 14 may be used as a temporary irrigation installation, as described hereinabove, for removal and use in other locations or it may be placed within concrete or other permanent type walled canals.

Obviously the invention is susceptible to some change or alteration without defeating its practicability, and I therefore do not wish to be confined to the preferred embodiment shown in the drawings and described herein.

I claim:
1. A conduit end opening control, comprising: a tubular member; a stop coaxially received by one end of said member; hinge means including a pair of spaced-apart supports connected at one end with said tubular member and projecting, at their other ends toward the plane defined by the end surface of said one end of said tubular member, and spaced arms connected with said stop and engaged with said supports for pivoting movement of said stop toward and away from said one end of said tubular member; and a generally rectangular tongue connected with said arms and frictionally engaging said supports, said supports each having oppositely disposed V-shaped edge surfaces intermediate their ends projecting toward and contacting opposing side edges of said tongue, the opposing edges of said tongue having a series of teeth extending transversely across the respective side edge for holding said stop in a selected angular position with respect to the longitudinal axis of said tubular member.

References Cited

UNITED STATES PATENTS

| | | | |
|---|---|---|---|
| 1,078,002 | 11/1913 | Schrey | 16—141 |
| 1,276,053 | 8/1918 | Gottschalk | 61—25 X |
| 2,342,531 | 2/1944 | Dean | 16—141 X |
| 2,940,471 | 6/1960 | Cupp | 137—527.6 |
| 3,144,876 | 8/1964 | Frye | 137—527.6 X |
| 3,274,917 | 9/1967 | Tolbert | 137—527.6 X |

PETER M. CAUN, Primary Examiner